June 2, 1959  W. A. REANEY ET AL  2,889,143
PREHEATER FOR ROTARY KILN
Filed Sept. 3, 1957  2 Sheets-Sheet 2

INVENTORS
Warford A. Reaney.
David W. Reaney.
BY Schmieding and Fultz
ATTORNEYS

2,889,143
PREHEATER FOR ROTARY KILN

Warford A. Reaney and David W. Reaney,
Delaware, Ohio

Application September 3, 1957, Serial No. 681,525

3 Claims. (Cl. 263—33)

This invention relates to rotary kilns such as the type used in the calcination of calcium carbonate in the production of commercial lime.

In general the rotary kiln of the present invention includes a rotatably mounted steel drum that includes an intake end for receiving calcium carbonate and an outlet end from which lime is discharged. As the material passes through the rotating drum it passes through a pre-heat zone provided by a plurality of hollow pre-heat sections mounted within the drum eccentric of the axis of rotation thereof. With this arrangement the material is divided into a number of separate portions each of which is conveyed inside one of the plurality of pre-heat sections whereby the material is more efficiently heated. According to the present invention the walls of the individual pre-heat sections are spaced one from another to provide passages for the radially outward flow of a coolant, such as air, which flow is continuously supplied to the passages between the individual pre-heat sections.

As another aspect of the present invention, each of the individual pre-heat sections is formed of a steel shell lined with a refractory material to provide a structurally strong and thermally efficient pre-heat section.

It is therefore an object of the present invention to provide a rotary kiln that includes a novel fluid cooled pre-heat section which will operate for long periods of time without structural failure under the high temperatures encountered.

It is another object of the present invention to provide a rotary kiln that includes a pre-heat zone consisting of a plurality of arcuate metallic walls that are combined with refractory arch constructions to form composite walls of high structural strength.

Further objects and advantages of the present invention will be apparent from the following description, reference being had to the accompanying drawing wherein preferred forms of embodiments of the invention are clearly shown.

Figure 1:
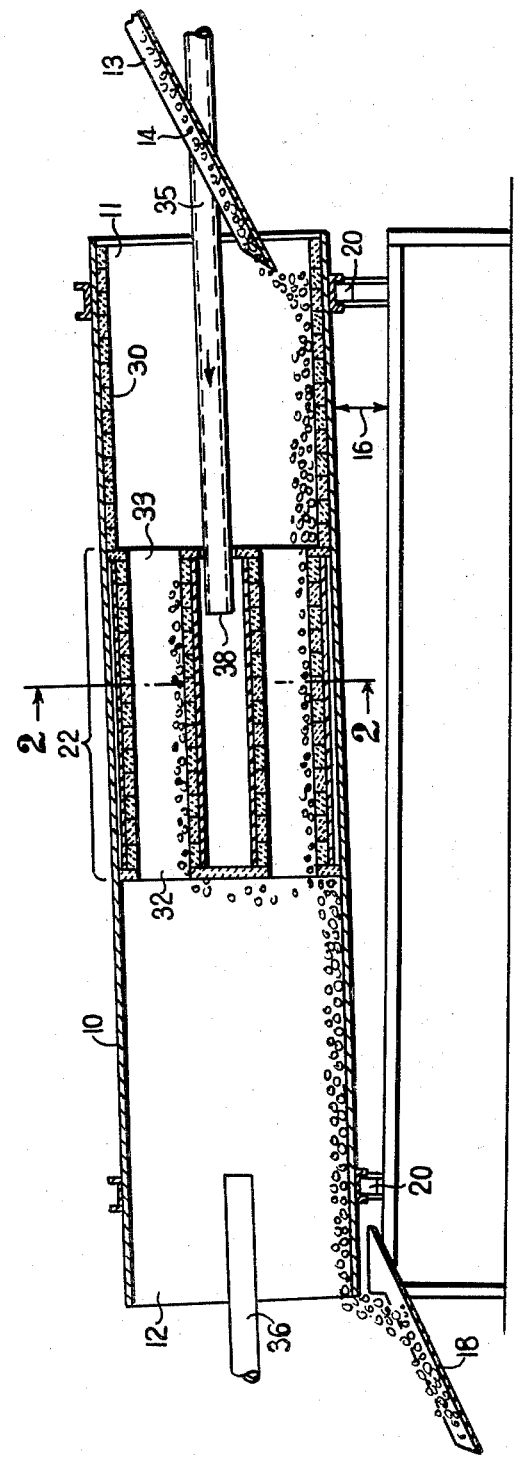
Figure 1 is a schematic sectional view of a rotary kiln constructed according to the present invention, the section being taken along the line 1—1 of Figure 2.

Referring in detail to the drawing, Figure 1 illustrates a rotary kiln that includes a metallic drum 10 formed of stainless steel or the like, having an intake opening 11 and a discharge opening 12. A delivery chute 13 delivers a supply 14 of calcium carbonate to the intake opening of drum 10 and due to the angle of declination 16 of the drum relative to the horizontal, the material 14 progresses along the lower portion of the drum to discharge opening 12 at which point it is released to a discharge chute 18.

Drum 10 is supported on a plurality of trunnions 20 and a prime mover and drive mechanism not illustrated serve to continuously rotate the drum on the trunnion.

Figure 2:
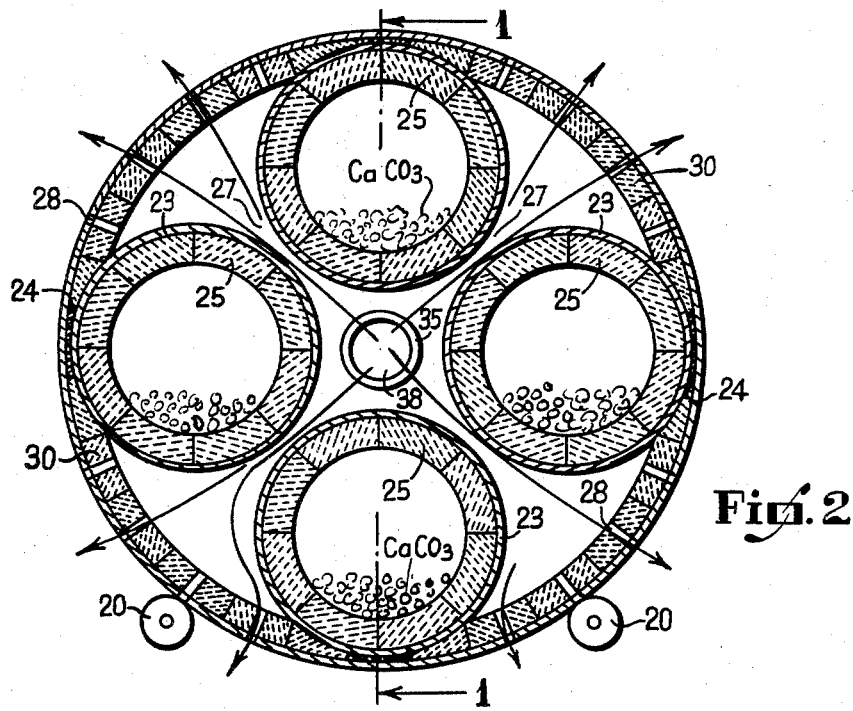
Figure 2 is a schematic sectional view taken through the pre-heat section of the rotary kiln of Figure 1, the section being taken along the line 2—2 of Figure 1.

With reference to Figures 1 and 2, as the material progresses along the lower section of drum 10 it encounters a pre-heat section 22 which comprises in one aspect of the invention illustrated in Figure 2, a plurality of hollow metallic tubes 23, formed of stainless steel or the like, mounted at 24 by welding or other suitable means, to the inner surface of drum 10. Each of the hollow metallic tubes 23 contains a liner 25 of refractory material which may be built up from a plurality of refractory blocks assembled in arch type construction. The outer walls of tubes 23 are spaced one from another to form a plurality of radially extending air passages 27 the outer ends of which communicate with coolant discharge openings 28 through the wall of drum 10. The inner wall of drum 10 is lined with protective layer 30 of refractory material.

As is best seen in Figure 1, the ends of coolant passages 27 are closed by cap plates 32 and 33 which may be formed of stainless steel and secured to the ends of steel tubes 23. A flow of coolant, such as cool air or the like, is delivered to the radially disposed coolant passages via a coolant intake conduit 35 leading from a source of coolant, not illustrated.

The kiln is fired from a fuel discharge line 36 which extends into the discharge end 12 of drum 10.

Figure 3:
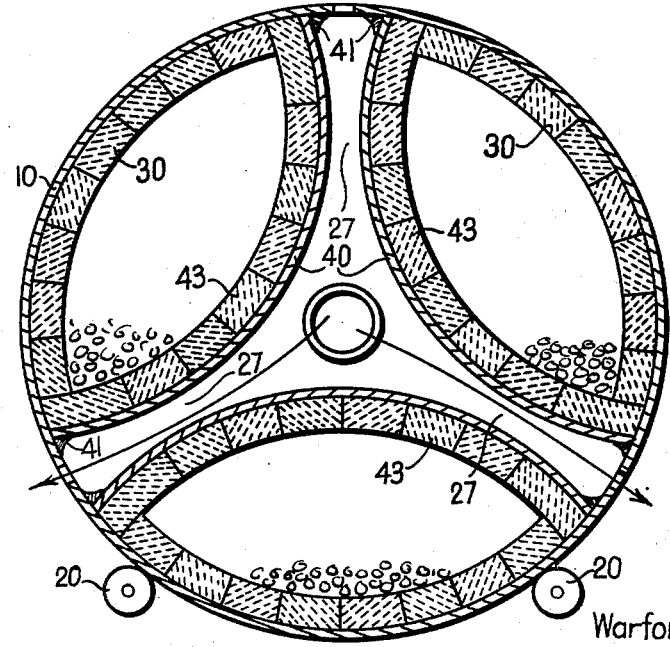
Figure 3 is a sectional view taken through a preheat section of a rotary kiln constructed according to the present invention and constituting a second aspect thereof.

Reference is next made to Figure 3 which diagrammatically illustrates a seond pre-heat section for a rotary kiln, constructed according to the present invention and constituting a second aspect thereof. Here again the rotary kiln includes a steel drum 10 lined with a layer of refractory material. Coolant is delivered via a conduit 35 to a plurality of radially disposed coolant passages 27 which communicate with a plurality of coolant discharge openings 28. The individual pre-heat sections, however, are formed by a plurality of arcuate walls 40 secured to the inner surface of drum 10 at 41. A refractory arch construction indicated generally at 43 is built up of a plurality of refractory blocks 44 so as to conform with the shape of the inner surface of drum 10. It will be noted that the tapered characteristics of block 44 of which arch 43 is constructed, cooperate with arcuate metallic wall 40 to form a composite wall of high structural strength. Since the arcuate metallic walls 40 are isolated from the material by the refractory walls 43 and since the coolant air from conduit 35 continuously wipes the outer surfaces of arcuate metallic walls 40, it will be understood that such composite wall construction will resist the high temperatures for long periods of time.

In operation, calcium carbonate 14 from chute 13 is continuously delivered to the intake end 11 of rotary drum 10. Since the drum is declined from the horizontal and rotated, the material progresses along the bottom of the drum and passes through pre-heat section wherein the material is divided into a plurality of portions. Hence the material will not accumulate in excessive quantities in the bottom of drum 10 with the resulting advantage that a greater surface area of the material is exposed to the hot gases and the heat is more rapidly and efficiently applied to the material. The coolant air discharged from outlet 38 of conduit 35 passes radially outwardly and wipes the outer surface of steel tubes 23. The pre-heat sections are thereby continuously cooled whereby deterioration of the steel walls is prevented. After the material leaves the outlets of the individual pre-heat sections it progresses along the bottom of drum 10 and is delivered to discharge chute 18.

While the forms of embodiments of the present invention as herein disclosed constitute preferred forms, it is

I claim:

1. A rotary kiln comprising, in combination, a drum rotatably mounted about a longitudinal axis, said drum including coolant outlets through the wall thereof; a plurality of arcuate walls having longitudinal edges secured to the inner surface of said drum to form a plurality of pre-heater sections of substantially elliptical cross-section, the walls of said sections being convex inwardly and spaced from one another to form a central longitudinal passage and a plurality of radial passages connecting said central passage with said coolant outlets; a layer of refractory material on the inner surface of said arcuate sections; and means for discharging a flow of coolant axially along said central passage.

2. A rotary kiln comprising, in combination, a drum mounted for rotation about a longitudinal axis and including an intake end, a discharge end, and a wall provided with coolant discharge openings, said drum including coolant outlets through the wall thereof; a plurality of arcuate metallic walls having longitudinal edges secured to the inner surface of said drum to form a plurality of pre-heater sections of substantially elliptical cross-section, said sections being convex inwardly and including intake ends for receiving a flow of material from said intake end of said drum and discharge ends for discharging said material to said discharge end of said drum, the walls of said sections being spaced from one another to form a central passage extending along the axial length of said pre-heat section, and a plurality of radial passages connecting said central passage with said coolant discharge openings; refractory means lining the inner surfaces of said arcuate metallic pre-heat sections; and conduit means for discharging a flow of coolant axially along said central passage whereby said radial passages conduct radially outwardly directed flows of coolant to said discharge openings.

3. A rotary kiln comprising, in combination, a drum mounted for rotation about a longitudinal axis and including an intake end, a discharge end, and a wall provided with coolant discharge openings, said drum including coolant outlets through the wall thereof; a plurality of arcuate metallic walls having longitudinal edges secured to the inner surface of said drum to form a plurality of pre-heater sections of substantially elliptical cross-section, said sections being convex inwardly and including intake ends for receiving a flow of material from said intake end of said drum and discharge ends for discharging said material to said discharge end of said drum, the walls of said sections being spaced from one another to form a central passage extending along the axial length of said pre-heat section, and a plurality of radial passages connecting said central passage with said coolant discharge openings; a refractory liner in each of said hollow metallic pre-heat members; refractory arch constructions conforming with the shape of said arcuate metallic pre-heat sections and forming protective coverings for the inner surfaces thereof; and conduit means for discharging a flow of coolant axially along said central passage whereby said radial passages conduct radially outwardly directed flows of coolant to said discharge openings.

References Cited in the file of this patent

UNITED STATES PATENTS

| | | |
|---|---|---|
| 2,007,121 | Johannsen | July 2, 1935 |
| 2,165,128 | Cheesman | July 4, 1939 |
| 2,283,129 | Roubal | May 12, 1942 |
| 2,319,548 | Kronstad | May 18, 1943 |